(12) United States Patent
Hiranuma et al.

(10) Patent No.: US 7,013,638 B2
(45) Date of Patent: Mar. 21, 2006

(54) EXHAUST GAS PURIFYING SYSTEM AND EXHAUST GAS PURIFYING METHOD

(75) Inventors: Satoshi Hiranuma, Tokyo (JP); Yoshinaka Takeda, Tokyo (JP); Toru Kawatani, Tokyo (JP); Reiko Doumeki, Tokyo (JP)

(73) Assignee: Mitsubishi Fuso Truck and Bus Corporation (JP)

( * ) Notice: Subject to any disclaimer, the term of this patent is extended or adjusted under 35 U.S.C. 154(b) by 94 days.

(21) Appl. No.: 10/808,208

(22) Filed: Mar. 24, 2004

(65) Prior Publication Data

US 2004/0244366 A1 Dec. 9, 2004

(30) Foreign Application Priority Data

Mar. 25, 2003 (JP) ............................ 2003-083652

(51) Int. Cl.
*F01N 3/00* (2006.01)

(52) U.S. Cl. ..................... 60/286; 60/274; 60/285; 60/295; 60/300; 60/311

(58) Field of Classification Search ............... 60/274, 60/285, 286, 295, 297, 311, 300; 123/299, 123/300
See application file for complete search history.

(56) References Cited

U.S. PATENT DOCUMENTS

| | | | | |
|---|---|---|---|---|
| 6,598,387 B1 * | 7/2003 | Carberry et al. | ............... | 60/297 |
| 6,622,480 B1 * | 9/2003 | Tashiro et al. | ................ | 60/295 |
| 6,666,020 B1 * | 12/2003 | Tonetti et al. | ................ | 60/286 |
| 6,698,192 B1 * | 3/2004 | Ootake | ........................ | 60/297 |
| 6,758,037 B1 * | 7/2004 | Terada et al. | ................. | 60/295 |

FOREIGN PATENT DOCUMENTS

| JP | 5-41809 B2 | 6/1993 |
|---|---|---|
| JP | 7-259533 A | 10/1995 |

* cited by examiner

*Primary Examiner*—Thomas Denion
*Assistant Examiner*—Diem Tran
(74) *Attorney, Agent, or Firm*—Rossi, Kimms & McDowell, LLP

(57) ABSTRACT

In regenerating a filter there are performed a first additional fuel injection involving additional injection of fuel into a cylinder after a main fuel injection in an engine to raise the temperature of an oxidation catalyst and a second additional fuel injection involving fuel injection after the first additional fuel injection to supply the oxidation catalyst with the fuel, a second additional fuel injection quantity is set in accordance with an engine speed and an engine load and is changed in accordance with an outlet temperature of the oxidation catalyst.

17 Claims, 6 Drawing Sheets

EXHAUST GAS PURIFYING SYSTEM AND EXHAUST GAS PURIFYING METHOD

BACKGROUND OF THE INVENTION (1) Field of the Invention

The present invention relates to an exhaust gas purifying system and an exhaust gas purifying method both suitable for use particularly in a diesel engine.

(2) Description of Related Art

Heretofore, there has been known a technique wherein an oxidation catalyst and a particulate filter (hereinafter referred to simply as "filter") are disposed in an exhaust passage of a diesel engine, allowing a particulate matter (PM) contained in exhaust gas to be deposited on the filter, and the PM thus deposited on the filter is burnt to regenerate the filter continuously.

In the exhaust gas purifying system constructed as above, NO contained in exhaust gas is oxidized in the oxidation catalyst to produce $NO_2$, then the $NO_2$ and the PM on the filter are reacted with each other, allowing the PM to burn (be oxidized) to regenerate the filter continuously. $NO_2$ exhibits a high function as an oxidizing agent in comparison with NO and permits the PM to be oxidized with a relatively low activation energy (that is, permits the PM to burn at a relatively low temperature).

In a certain operating condition of an engine there is a case where the exhaust gas temperature does not rise to an activation temperature of the oxidation catalyst, so that NO is not oxidized and hence a continuous regeneration of the filter is not effected. In such a case it is necessary to perform a forced regeneration different from the continuous regeneration.

As a method for the forced regeneration there is known a method wherein a heat source such as an electric heater is attached to the filter and an electric current is supplied to the heater, allowing PM to burn, or a method wherein fuel (HC) is fed to the oxidation catalyst and is allowed to undergo an oxidation reaction in the oxidation catalyst, the temperature of the filter is increased by the reaction heat to cause burning of the PM (see, for example, Japanese Patent Laid-Open No. H07(1995)-259533).

More particularly, according to the technique described in the above literature, if the temperature of a filter (a filter with catalyst) is not higher than an activation temperature (e.g., 250° C.) of the catalyst, an additional fuel (first additional fuel) is injected in an amount proportional to the filter temperature. The injection timing of this additional fuel is relatively earlier than a final stage of the expansion stroke. By injecting fuel at such a timing, the additional fuel and a high-temperature combustion gas present within the cylinder are mixed together, so that the additional fuel burns in the intake port and in the exhaust passage and the exhaust gas temperature rises.

As a result of the high-temperature exhaust gas being fed to the catalyst, the catalyst temperature rises, and when the catalyst temperature rises to its activation temperature, an additional fuel (second additional fuel) is further injected also in the expansion stroke in addition to the first additional fuel described above. The second additional fuel injected in the expansion stroke reaches the catalyst without burning in the cylinder and in the exhaust port, and is burned in the catalyst whose temperature has reached the activation temperature. As a result, the filter located downstream of the catalyst is heated up to a temperature which permits oxidation of PM, whereby the combustion of PM (regeneration of the filter) is executed.

According to the technique disclosed in the above literature, the amount of the first additional fuel to be injected is changed according to the filter temperature, but with such a method, it is difficult to hold the filter temperature stably in the temperature region (600° C. and thereabouts) in which the PM burns most efficiently.

That is, according to the technique disclosed in the above patent literature, the amount of the first additional fuel to be injected is changed according to the filter temperature for the purpose of maintaining the catalyst temperature at its activation temperature, but once the catalyst temperature reaches the activation temperature, the quantity of the second additional fuel is set to a predetermined quantity. It is the second additional fuel quantity that exerts a great influence on the filter temperature, but according to the technique disclosed in the above patent literature it is impossible to control the filter temperature because the second additional fuel quantity is set constant. If the filter temperature is too high, PM burns in a short time and the filter temperature becomes a still higher temperature, with consequent likelihood of fusion of the filter, while a too low temperature will result in a defective regeneration.

It may be effective to control the additional fuel injection quantity in accordance with the engine speed and engine load, but also by this method it is impossible to control the filter temperature to an optimal temperature.

SUMMARY OF THE INVENTION

The present invention has been accomplished in view of the above-mentioned problems and it is an object of the invention to provide an exhaust gas purifying system which permits the temperature of a filter to be kept stable during a forced regeneration of the filter.

Accordingly, an exhaust gas purifying system according to the present invention comprises an oxidation catalyst disposed in an exhaust passage of an engine, a filter disposed in the exhaust passage at a position downstream of the oxidation catalyst to collect a particulate matter contained in exhaust gas, a first additional fuel control means which injects a first additional fuel into a cylinder during a forced regeneration of the filter and after a main fuel injection in the engine, a second additional fuel control means which supplies a second additional fuel to the oxidation catalyst after a rise in temperature of the oxidation catalyst up to an activation temperature of the catalyst and after the injection of the first additional fuel, a temperature detecting means for detecting an outlet temperature of the oxidation catalyst, an engine speed detecting means for detecting an engine speed of the engine, a load detecting means for detecting a load of the engine, and a second additional fuel supply quantity setting means which sets a supply quantity of the second additional fuel in accordance with information provided from the engine speed detecting means and the load detecting means and which changes the second additional fuel supply quantity in accordance with information provided from the temperature detecting means.

The second additional fuel supply quantity setting means may be constructed so as to comprise a first fuel injection quantity map in which a fuel supply quantity is set, a second fuel injection quantity map in which a fuel supply quantity is set smaller than in the first fuel injection quantity map, and a switching means which, when the oxidation catalyst outlet temperature has become lower than a predetermined value, sets the first fuel injection quantity map as a map for setting the second additional fuel supply quantity, and which, when the oxidation catalyst outlet temperature has become a value of not smaller than the predetermined value, makes switching from the first fuel injection quantity map to the second fuel injection quantity map.

Preferably, the first fuel injection quantity map is an increment map in which the fuel supply quantity of the second additional fuel to be injected into the cylinder is set relatively large, and the second fuel injection quantity map is a decrement map in which the second additional fuel supply quantity is set relatively small.

The second additional fuel control means may be constructed so as to inject fuel into the cylinder to supply the oxidation catalyst with the fuel.

The second additional fuel control means may be constructed so as to inject fuel onto the exhaust passage to add the fuel to the oxidation catalyst.

Preferably, the first fuel injection quantity map is an increment map in which the quantity of the second additional fuel to be injected onto the exhaust passage is set relatively large, and the second fuel injection quantity map is a decrement map in which the second additional fuel injection quantity is set relatively small.

The second additional fuel supply quantity setting means may be constructed so as to comprise a basic map in which a basic additional fuel supply quantity is stored and a correction means which, in accordance with the oxidation catalyst outlet temperature, corrects the fuel supply quantity obtained from the basic map, the fuel supply quantity corrected by the correction means being set as the second additional fuel supply quantity.

The second additional fuel supply quantity setting means may be constructed so as to comprise a first fuel injection quantity map in which the fuel supply quantity is set rather large, a second fuel injection quantity map in which fuel supply quantity is set smaller than in the first fuel injection quantity map, a third fuel injection quantity map in which the fuel injection quantity is set still larger than in the first fuel injection quantity map, and a switching means which selects the third fuel injection quantity map when the oxidation catalyst outlet temperature is lower than a first predetermined value, selects the first fuel injection quantity map when the oxidation catalyst outlet temperature is not lower than the first predetermined value and lower than a second predetermined value, and selects the second fuel injection quantity map when the oxidation catalyst outlet temperature becomes a value of not smaller than the second predetermined value.

Preferably, the exhaust gas purifying system further comprises a forced regeneration start determining means which determines whether a forced regeneration of the filter is to be started or not.

Preferably, the forced regeneration start determining means has a deposition quantity estimating means for estimating or calculating a deposition quantity of a particulate matter deposited on the filter, and when the deposition quantity estimated or calculated by the deposition quantity estimating means becomes a value of not smaller than a predetermined value, the start of a forced regeneration of the filter is determined by the forced regeneration start determining means.

Preferably, the exhaust gas purifying system further comprises an absolute pressure detecting means for detecting an absolute pressure on an inlet side of the filter and a differential pressure detecting means for detecting a differential pressure between an inlet-side pressure and an outlet-side pressure of the filter, and the deposition quantity estimating means estimates or calculates the deposition quantity of the particulate matter on the basis of information provided from both the absolute pressure detecting means and the differential pressure detecting means.

Preferably, the exhaust gas purifying system further comprises an oxygen mass flow rate detecting means for detecting or calculating a mass flow rate of oxygen fed to the filter and a regeneration end determining means for determining a regeneration end of the filter in accordance with information provided from the oxygen mass flow rate detecting means and upon arrival of an integrated value of the oxygen mass flow rate at a predetermined value during a forced regeneration of the filter.

The exhaust gas purifying system may further comprise a regeneration end determining means for determining a regeneration end of the filter upon lapse of a predetermined time from the start of the forced regeneration.

Preferably, the engine is a diesel engine.

According to the present invention there also is provided an exhaust gas purifying method using an oxidation catalyst disposed in an exhaust passage of an engine and a filter disposed in the exhaust passage at a position downstream of the oxidation catalyst to collect a particulate matter contained in exhaust gas, and wherein a first additional fuel is injected into a cylinder during a forced regeneration of the filter and after a main fuel injection in the engine, and a second additional fuel is supplied to the oxidation catalyst after a rise in temperature of the oxidation catalyst up to an activation temperature of the catalyst and after the injection of the first additional fuel, the method comprising the steps of detecting an outlet temperature of the oxidation catalyst, an engine speed of the engine and a load of the engine, and setting a supply quantity of the second additional fuel on the basis of the engine speed and the load and changing the second additional fuel supply quantity on the basis of the outlet temperature of the oxidation catalyst.

The exhaust gas purifying method may be constructed so that the second additional fuel is injected into the cylinder of the engine or is injected onto the exhaust passage of the engine.

Preferably, the exhaust gas purifying method further comprises a step of determining whether an integrated value of an oxygen mass flow rate from the time-point of arrival of the temperature of the filter at a predetermined temperature during execution of the forced regeneration has reached a predetermined value or not.

Preferably, the exhaust gas purifying method further comprises a step of terminating the forced regeneration upon arrival of the integrated value of the oxygen mass flow rate at a predetermined value.

Thus, according to the present invention there can be obtained any of the following effects.

By executing a simple feedback control it is possible to stabilize the filter temperature irrespective of an engine operating condition and the atmospheric temperature and hence there accrues an advantage such that not only it is possible to prevent fusion of the filter but also it is possible to let PM burn efficiently. Besides, after the start of forced regeneration, the filter temperature can be raised rapidly up to a target temperature.

Since the second additional fuel injection quantity is changed by switching from one to another map among plural maps, the control logic is very simple and the reliability of control can be enhanced.

Further, when an integrated value of an oxygen mass flow rate from the time-point of arrival of the filter temperature at a predetermined temperature has reached a predetermined value, the forced regeneration of the filter is terminated and therefore there accrues an advantage that the regeneration end of the filter can be determined with a high accuracy.

DESCRIPTION OF THE PREFERRED EMBODIMENTS

Figure 1:
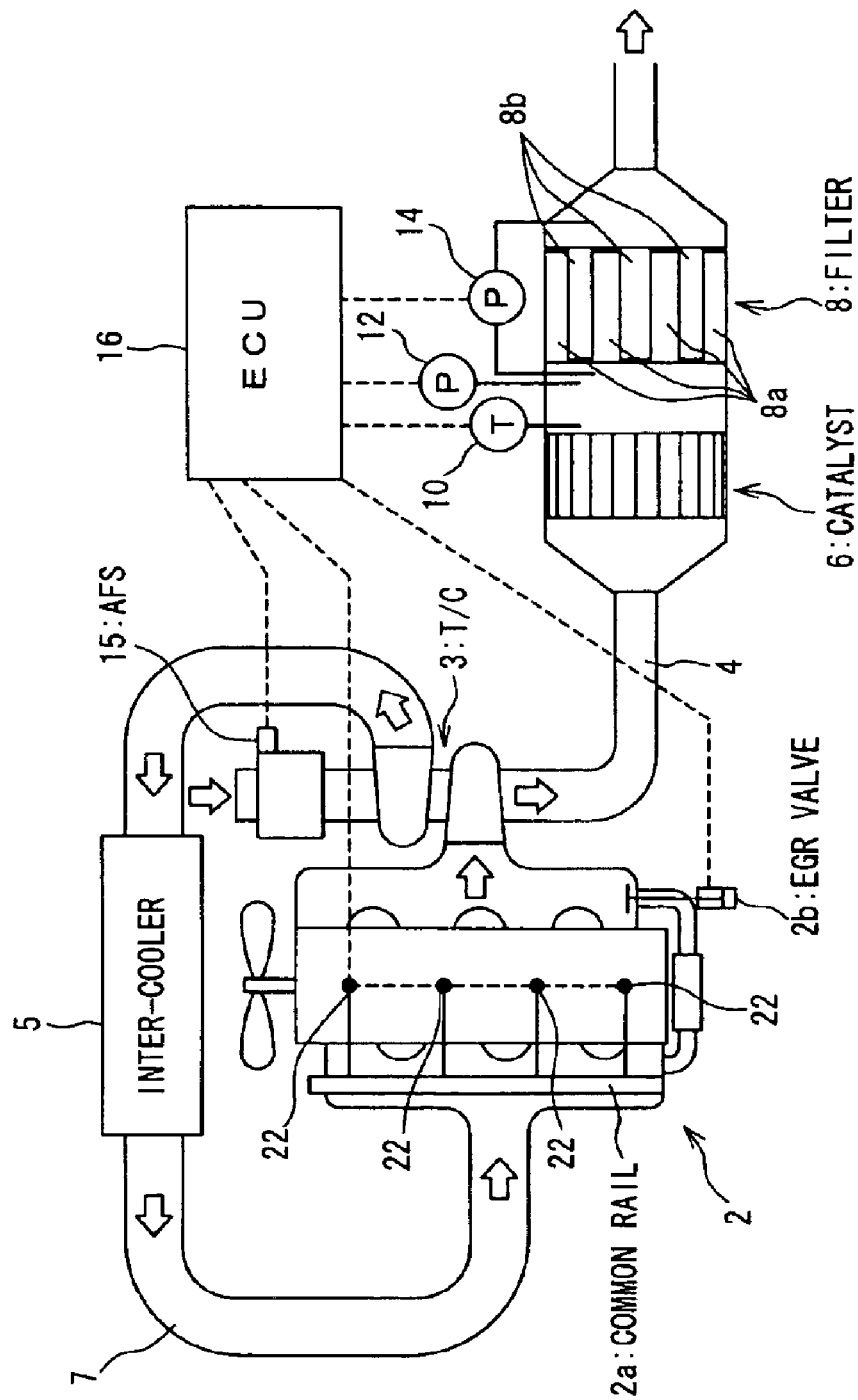
FIG. 1 is a schematic diagram showing an entire construction of an exhaust gas purifying system according to an embodiment of the present invention.

An exhaust gas purifying system according to an embodiment of the present invention will be described with reference to the accompanying drawings, in which FIG. 1 is a schematic diagram showing an entire construction of the exhaust gas purifying system. In this embodiment, an engine 2 is a diesel engine using gas oil (HC) as fuel. The engine 2 is provided with a common rail type fuel injection system wherein fuel is once stored in a high pressure storage chamber (common rail) 2a which is common to plural cylinders and is then injected.

In an exhaust passage 4 of the engine 2, an oxidation catalyst (hereinafter referred to simply as "catalyst") 6 and a diesel particulate filter (simply "filter" hereinafter) 8 are disposed in this order from an upstream side of an exhaust gas flow. Further, a turbocharger 3 is disposed in the exhaust passage 4 and an inter-cooler 5 is disposed in an intake passage 7.

Though not shown in detail, the whole of the filter 8 is formed of a porous material, and the filter 8 comprises first passages 8a which are open upstream and closed downstream and second passages 8b which are closed upstream and open downstream, the first and second passages 8a, 8b being arranged in an alternately adjacent manner. According to this arrangement, exhaust gas fed into the filter 8 flows from the first passages 8a to the second passages 8b through porous wall portions. At this time, PM (a particulate matter consisting principally of carbon C) contained in the exhaust gas is collected in the wall portions.

The oxidation catalyst 6 exhibits the same function as that described above in connection with the prior art. During normal running of the vehicle concerned, NO contained in exhaust gas is oxidized in the oxidation catalyst 6 into $NO_2$, which is then fed as an oxidizing agent to the filter 8. In the filter 8, the $NO_2$ reacts with PM, so that the PM burns and the filter 8 is regenerated continuously.

Between the catalyst 6 and the filter 8 there are disposed a temperature sensor (temperature detecting means) 10 for detecting an outlet temperature of the catalyst 6 and an inlet temperature of the filter 8 and a pressure sensor (absolute pressure detecting means) 12 for detecting an absolute pressure. In the filter 8 there is provided a differential pressure sensor (differential pressure detecting means) 14 for detecting a differential pressure between an upstream-side pressure and a downstream-side pressure in the filter 8. Further, upstream of the intake passage 7 there is disposed an air flow sensor (AFS) 15 for detecting the flow rate of intake air.

Although in this embodiment the pressure sensor 12 and the differential pressure sensor 14 are provided each independently, absolute pressure detecting sensors may be respectively disposed upstream and downstream of the filter 8, allowing them to also fulfill the functions of the pressure sensor 12 and the differential pressure sensor 14. That is, the portion in question may be constructed such that a detected value obtained in the upstream sensor is detected as an absolute pressure and a differential pressure is calculated from detected values obtained in the upstream and downstream sensors.

The sensors 10, 12, 14, and 15 are connected to an ECU 16 as a control means. The ECU 16 comprises an input/output device, memories (ROM, RAM, non-volatile memory), an arithmetic unit (CPU), and a timer counter. A synthetic control for the engine 1 is executed by the ECU 16.

Figure 2:
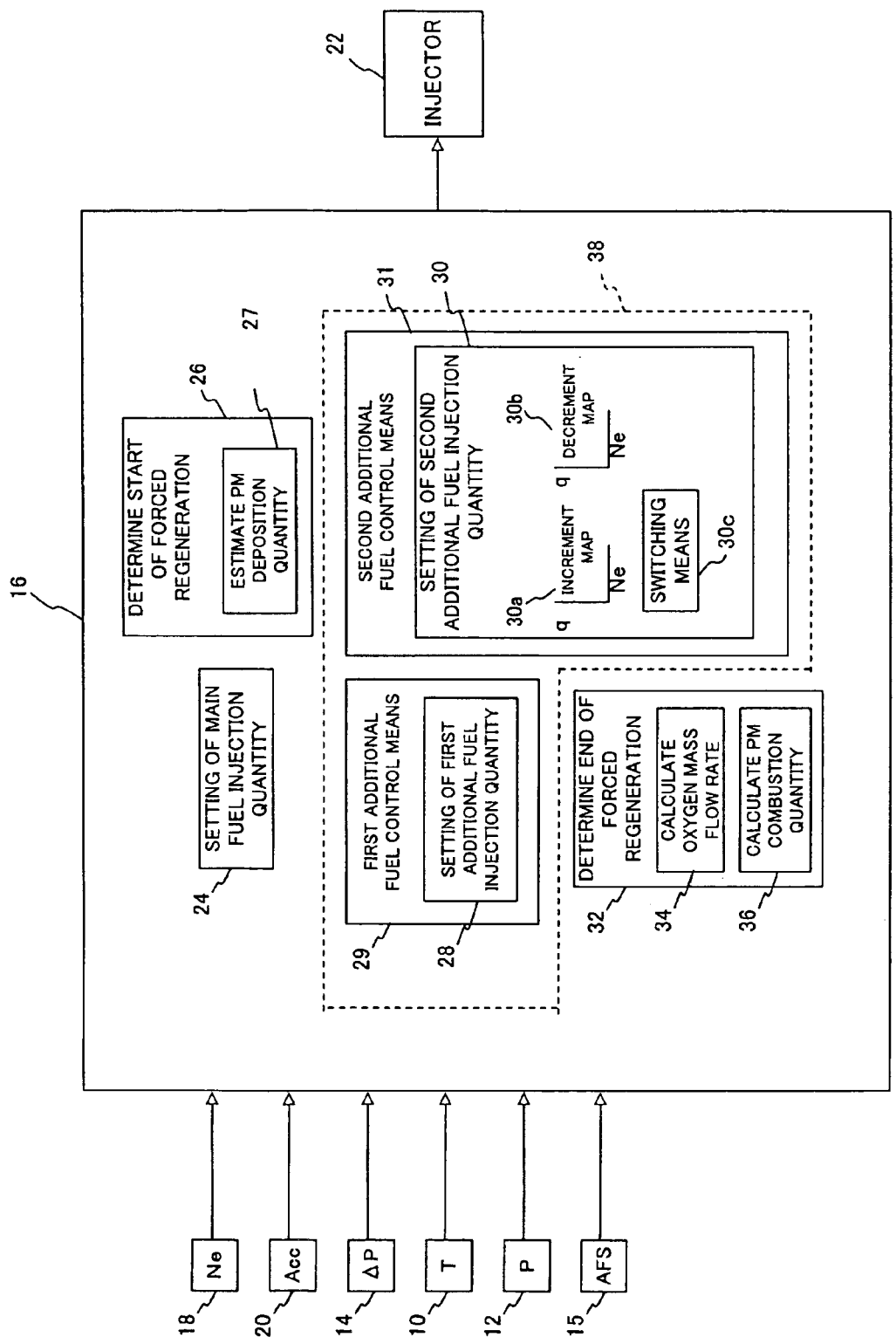
FIG. 2 is a schematic diagram showing the construction of a principal portion of the exhaust gas purifying system.

As shown in FIG. 2, on an input side of the ECU 16 there are provided an engine speed sensor (engine speed detecting means) 18 for detecting an engine speed Ne of the engine 2 and an accelerator position sensor 20 for detecting an accelerator position, in addition to the sensors 10, 12, and 14.

To an output side of the ECU 16 there are connected various output devices, including an injector (fuel injection valve) 22 and an EGR valve 2b shown in FIG. 1, and control signals provided from the ECU 16 are inputted to those output devices.

Within the ECU 16, as shown in FIG. 2, there are provided a main fuel injection quantity setting means 24, a forced regeneration start determining means 26, a first additional fuel control means 29, a second additional fuel control means 31, and a forced regeneration end determining means 32. In this embodiment, a filter regenerating means 38 is constituted by the first and second additional fuel control means 29, 31.

In the first additional fuel control means 29 there is provided a first additional fuel quantity setting means 28, while in the second additional fuel control means 31 there is provided a second additional fuel injection quantity setting means 30.

The main fuel injection quantity setting means 24 is for setting a fuel injection quantity (main injection quantity), q main, in normal running of the vehicle. Within the main fuel injection quantity setting means 24 there is stored a three-dimensional map using the engine speed Ne and the accelerator position Acc as parameters. In the main fuel injection quantity setting means 24, a main injection quantity, q main, is set in accordance with information provided from the engine speed sensor 18 and the accelerator position sensor 20. In the common rail type fuel injection system, the fuel injection quantity is controlled in accordance with the operation time of the injector 22, while in the main fuel injection quantity setting means 24 the operation time of the injector 22 is set so as to give the set fuel injection quantity.

The forced regeneration start determining means 26 determines whether a forced regeneration of the filter 8 is to be started or not. In the forced regeneration start determining means 26 there is provided a PM deposition quantity estimating means 27 for estimating (or calculating) a PM deposition quantity in accordance with information provided from the pressure sensor 10 and the differential pressure sensor 14. When the PM deposition quantity estimated by the PM deposition quantity estimating means 27 has reached a predetermined value or a larger value, the forced regeneration start determining means 26 determines that the filter 8 is clogged without being regenerated continuously, and determines that a forced regeneration of the filter 8 is to be started.

More specifically, in an operating condition (mainly a low speed and low load operation) wherein the exhaust gas temperature in the engine 2 is low, the exhaust gas temperature does not rise up to an activation temperature of the oxidation catalyst 6 and hence NO is not oxidized, therefore a continuous regeneration of the filter 8 may not be executed. In this case, PM is deposited too much on the filter 8, resulting in the filter being clogged. In view of this point, the forced regeneration start determining means 26 determines the start of forced regeneration of the filter 8 in accordance with pressure information on the filter. As to the PM deposition quantity estimating method, a detailed description thereof will here be omitted because various methods are already known.

According to the forced regeneration method used in this embodiment, first exhaust gas of a high temperature is fed directly to the catalyst 6, causing the catalyst temperature to rise up to its activation temperature (e.g., 250° C.), thereafter fuel is fed to the catalyst 6, allowing the fuel to undergo an oxidation reaction, and the filter temperature is raised by the reaction heat to burn the PM.

Figure 3A:
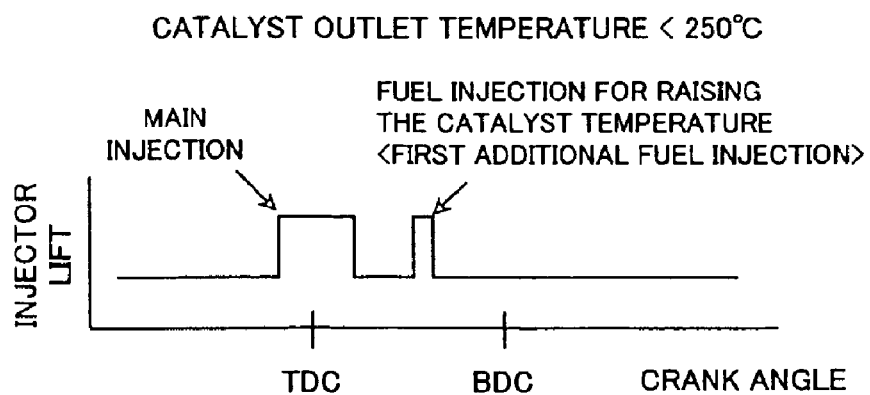
FIGS. 3A and 3B illustrate additional fuel injection timings in the exhaust gas purifying system.

When a forced regeneration is started by the forced regeneration start determining means 26, as shown in FIG. 3A, first in an expansion stroke an additional fuel (first additional fuel) is injected and the heat resulting from combustion of this additional fuel is used to raise the temperature of the catalyst 6.

The first additional fuel injection quantity setting means 28 sets a first additional fuel injection quantity q1 in accordance with an operating condition of the engine 2 and a catalyst outlet temperature detected by the temperature sensor 10. During the catalyst heat-up control, there also are performed retarding of main fuel injection timing and intake throttling in addition to the first additional fuel injection.

As shown in FIG. 3A, the first additional fuel injection timing is in a relatively early stage rather than a final stage of the expansion stroke, and by injecting the first additional fuel at such a timing the additional fuel and the high-temperature combustion gas in the cylinder are mixed together, the additional gas burns in an exhaust port and in the exhaust passage, and a high-temperature exhaust gas is fed to the catalyst 6 to raise the catalyst temperature.

Figure 3B:
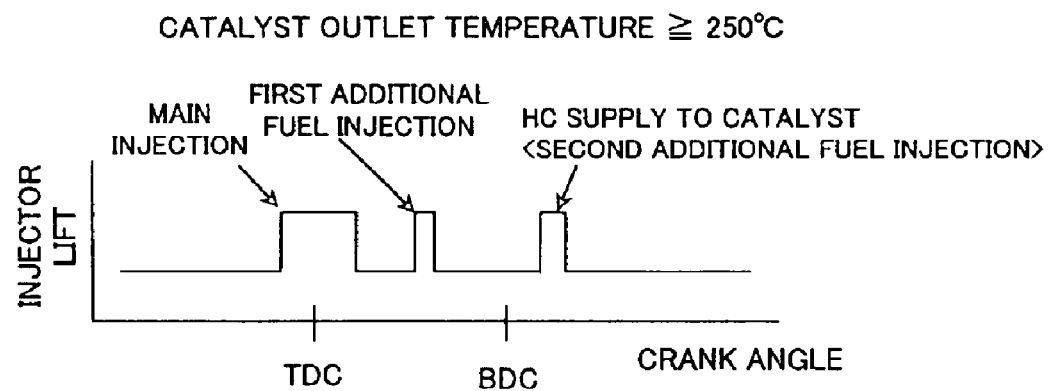

When it is determined in accordance with information provided from the temperature sensor 10 that the catalyst outlet temperature (the temperature of the catalyst 6) has increased to the activation temperature, a still additional fuel (second additional fuel) is injected after the injection of the first additional fuel, as shown in FIG. 3B. This second additional fuel is injected for example in an exhaust stroke. By such a timing of fuel injection, the fuel reaches the catalyst 6 without burning in the cylinder or in the exhaust passage and there is performed burning of the fuel in the catalyst 6 whose temperature has reached the activation temperature. As a result, the filter 8 positioned downstream of the catalyst 6 is heated and its temperature is raised up to a temperature (600° C.) at which the PM can be oxidized, whereby burning of the PM (regeneration of the filter) is executed.

The second additional fuel injection quantity setting means 30 sets such a second additional fuel injection quantity q2 in accordance with the engine speed Ne, engine load (here the main injection quantity, q main) and the catalyst outlet temperature.

A description will now be given of a method for setting the second additional fuel injection quantity q2. As shown in FIG. 2, in the second additional fuel injection quantity setting means 30 there are provided two maps 30a and 30b of different characteristics and a switching means 30c which makes switching to select one of those two maps. In each of the maps 30a and 30b there is stored a second additional fuel injection quantity using the engine speed Ne and load (main injection quantity, q main) as parameters. In accordance with information provided from the temperature sensor 10 the switching means 30c selects one of the two maps 30a and 30b and sets the second additional fuel injection quantity q2 in accordance with the selected map.

Of the two maps 30a and 30b, one map 30a is constituted as an increment map (a first fuel injection quantity map) in which the second additional fuel injection quantity is set relatively large, while the other map 30b is constituted as a decrement map (a second fuel injection quantity map) in which the second additional fuel injection quantity is set relatively small.

If the catalyst outlet temperature (filter inlet temperature) detected by the temperature sensor 10 is lower than a predetermined target temperature (here 600° C.), the second additional fuel injection quantity determining means 30 selects the increment map 30a and sets the second additional fuel injection quantity q2, while if the catalyst outlet temperature is not lower than the above predetermined temperature, the second additional fuel injection quantity setting means 30 selects the decrement map 30b and sets the second additional fuel injection quantity q2.

By thus making a simple feedback control based on the catalyst outlet temperature, for example when the catalyst outlet temperature is as high as 600° C. or more, the HC (fuel) fed to the catalyst 6 is suppressed, whereby a further increase in temperature of the filter 8 can be suppressed. As a result, it is possible to suppress overcombustion of PM and surely prevent fusion of the filter 8. Further, when the catalyst outlet temperature is lower than 600° C., the filter temperature can be increased by increasing the amount of HC fed. In this way the filter temperature (especially the central temperature of the filter) can be held at a temperature near 600° C. at which the PM burns most efficiently.

A brief description will now be given of both increment map 30a and decrement map 30b which are provided in the second additional fuel injection quantity setting means 30. Heretofore, only one map has been provided in the second additional fuel injection quantity setting means 30, but with such a single map it has been difficult to stabilize the temperature of the filter 8. In this embodiment, a value obtained by adding for example only Δq to a conventional map value is stored in memory and is set as the increment map 30a, while a value obtained by subtracting for example only Δq from a conventional map value is set as the decrement map 30b, and these two maps 30a and 30b are switched from one to the other according to temperature conditions. Thus it can be said that the second additional fuel injection quantity setting means 30 not only sets the second additional fuel injection quantity q2 in accordance with the engine speed Ne and load but also changes the fuel injection quantity q2 in accordance with the catalyst outlet temperature.

Since the main injection quantity, q main, used as a load is set by the main fuel injection quantity setting means 24, it follows that the main fuel injection quantity setting means 24 also functions as a load detecting means. The position of the accelerator may be used as a load instead of the main injection quantity, q main. In this case, the accelerator position sensor 20 functions as a load detecting means. The construction of the second additional fuel injection quantity setting means 30 is not limited to the above construction. For example, there may be adopted a construction wherein a map for setting a basic fuel injection quantity and a correction means for correcting the basic fuel injection quantity, (neither shown), are provided in the second additional fuel injection quantity setting means 30, and a correction corresponding to the catalyst outlet temperature is applied to the fuel injection quantity obtained from the said map (for example, multiplying the fuel injection quantity by a correction coefficient), and the thus corrected fuel injection quantity is set as a second additional fuel injection quantity.

A more detailed control may be conducted by providing three maps in the second additional fuel injection quantity setting means 30. More specifically, a second increment map (a third fuel injection quantity map) which sets the fuel injection quantity still larger than in the increment map 30a is provided in addition to the increment map 30a and the decrement map 30b, and for example the second increment map is used when the catalyst outlet temperature is lower than 400° C., the increment map 30a is used when the catalyst outlet temperature is not lower than 400° C. and lower than 600° C., and the decrement map 30b is used when the catalyst outlet temperature is 600° C. or higher.

A more concrete description will now be given about the forced regeneration end determining step. In the forced regeneration end determining means 32 there is provided an oxygen mass flow rate calculating means (oxygen mass flow rate detecting means) 34 for calculating a mass flow rate of oxygen. In the oxygen mass flow rate calculating means 34, an oxygen mass flow rate $O_{2w}$ is calculated in accordance with the following equation:

$$O_{2w} = (Q_{aw} - q \cdot a) \cdot b$$

In the above equation, $Q_{aw}$ stands for a mass flow rate of intake air obtained from AFS15, q stands for a total fuel injection quantity (main fuel injection quantity +additional fuel injection quantity), a stands for an equivalence ratio (14.7), and b stands for an oxygen mass ratio. A mass flow rate of oxygen entering the filter 8 can be calculated in accordance with the above equation.

In the forced regeneration end determining means 32 there also is provided a PM combustion quantity estimating means 36 in addition to the oxygen mass flow rate calculating means 34. In the PM combustion quantity estimating means 36, the integrated value $\Sigma O_{2w}$ of oxygen mass flow rate calculated in the oxygen mass flow rate calculating means 34 is multiplied by the coefficient C to calculate the combustion quantity of PM. This is because the amount of PM burnt in the filter 8 corresponds substantially linearly to the amount of oxygen consumed in the filter 8, as noted earlier.

In the forced regeneration end determining means 32, the amount of PM estimated in the PM deposition quantity estimating means 27 at the beginning of forced regeneration is set as a target value, and when the combustion quantity of PM estimated by the PM combustion quantity estimating means 36 reaches the said target value, it is determined that the forced regeneration of the filter 8 is over. That is, when the relation of $C \cdot \Sigma O_{2w} \geq$ target value is satisfied, it is determined that the forced regeneration is over.

When it is determined in the forced regeneration end determining means 32 that the forced regeneration of the filter 8 is over, the first and second additional fuel injection is stopped and the associated controls such as retarding of the main fuel injection timing and throttling of intake air are also stopped, with return to the normal operating condition.

Figure 4:
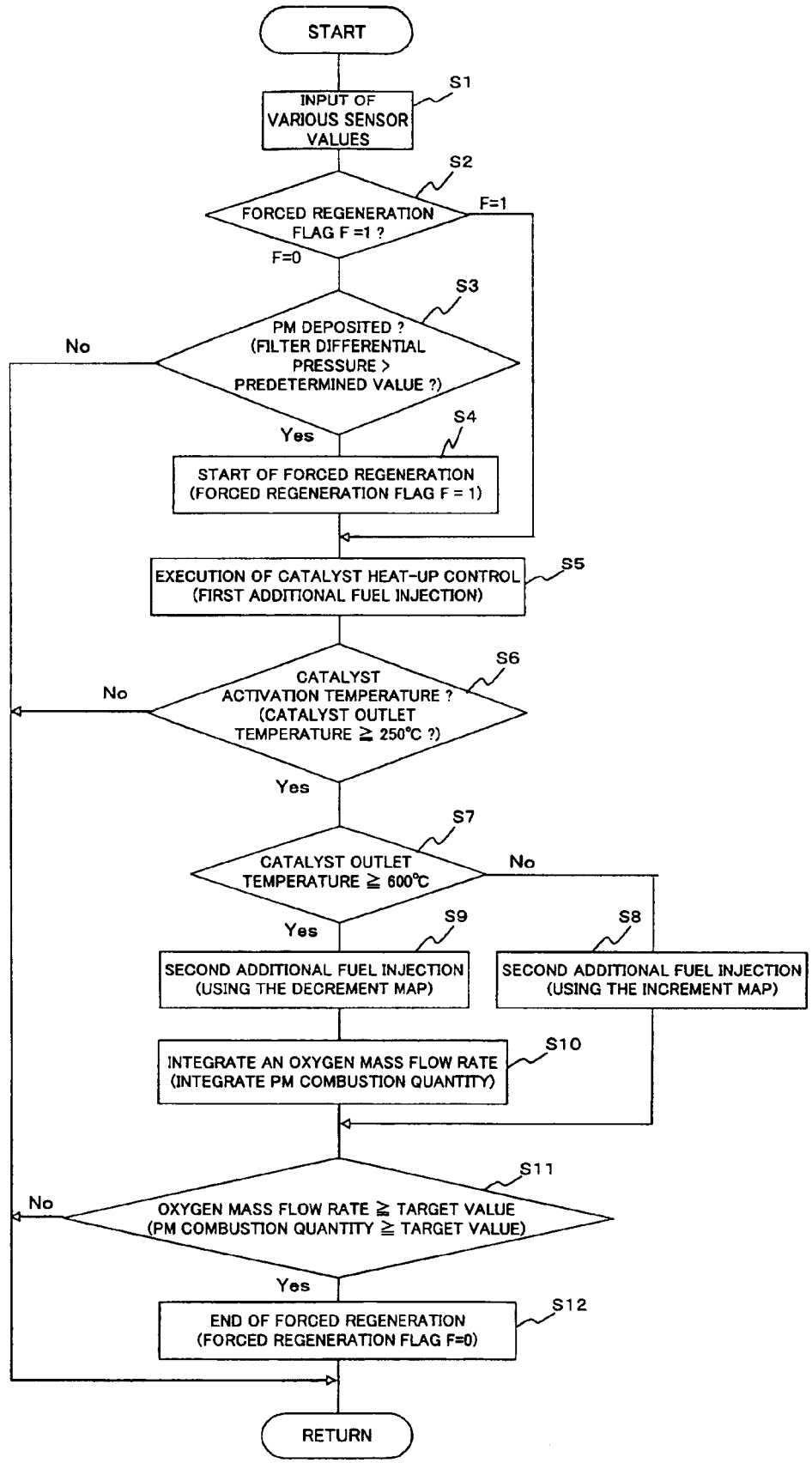
FIG. 4 is a flow chart explaining the operation of the exhaust gas purifying system.

The exhaust gas purifying system embodying the present invention is constructed as above. The operation thereof will be described below in accordance with the flow chart of FIG. 4.

First, in step S1, information from various sensors is inputted. Next, in step S2, it is determined whether Forced Regeneration Flag F is 0 or 1. Forced Regeneration Flag F is used to determine whether a forced regeneration is being executed or not. As will be described later, F is set to 1 when forced regeneration is executed, while F is set to 0 when forced regeneration is not executed. In the initial control cycle, Forced Regeneration Flag F is set to 0, so in this case the processing flow advances to step S3.

In step S3, the deposition quantity of PM is estimated in accordance with information provided from the pressure sensor 12 and the differential pressure sensor 14 and it is determined whether the PM deposition quantity corresponds to a value of not smaller than a predetermined value a or not. If the answer is affirmative, the flow advances to step S4. In step S4, it is determined that the filter 8 is clogged without being regenerated continuously, and the start of forced regeneration is determined. At this time, Forced Regeneration Flag F is set to 1. In step S3 it may be merely determined whether the pressure difference between inlet and outlet pressures in the filter 8, which is detected by the differential pressure sensor 14, has become a value of not smaller than a predetermined value or not, and when the answer is affirmative, the start of forced regeneration may be determined in step S4.

Once the start of forced regeneration is determined in step S4, the flow advances to step S5, in which a heatup control for the catalyst 6 is executed. In this catalyst heat-up control, as shown in FIG. 3A, an additional fuel (first additional fuel) is injected after the main fuel injection. As this additional fuel burns, the temperature of the catalyst 6 rises.

Next, in step S6, it is determined whether the temperature of the catalyst 6 (actually the catalyst outlet temperature) has reached an activation temperature (about 250° C.) or not, and if the catalyst temperature is lower than the activation temperature, the flow returns. In this case, in the next and subsequent control cycles, the routine of steps S1, S2, S5 and S6 is repeated and only heat-up of the catalyst 6 is executed until the temperature of the catalyst 6 reaches the activation temperature.

If it is determined in step S6 that the catalyst temperature has reached the activation temperature, the flow advances to step S7, in which an additional fuel injection (second additional fuel injection, see FIG. 3B) is executed for the combustion of PM. In this case, first in step S7 it is determined whether the catalyst outlet temperature is not lower than a predetermined temperature (e.g., 600° C.) or not. The predetermined temperature corresponds to a temperature at which the filter 8 is activated and PM burns most efficiently. If the catalyst outlet temperature is lower than the predetermined temperature, the flow advances to step S8, in which the second additional fuel injection quantity q2 is set using the increment map 30a. If the catalyst outlet temperature is not lower than the predetermined temperature, the flow advances to step S9, in which the second additional fuel injection quantity q2 is set using the decrement map 30*b*. That is, if the catalyst outlet temperature is lower than the predetermined temperature, the second additional fuel injection quantity q2 is set to a rather large value, while if is not lower than the predetermined temperature, the second additional fuel injection quantity q2 is set to a rather small value.

Next, in step S10, an integrated value $\Sigma O_{2w}$ of a mass flow rate of oxygen fed to the filter 8 after arrival of the catalyst outlet temperature at the predetermined temperature is calculated, and an integrated value $C \cdot \Sigma O_{2w}$ of PM which has burnt in the filter 8 is obtained by multiplying the result of the above calculation by a predetermined coefficient C.

Thereafter, the flow advances to step S11, in which it is determined whether the integrated value $C \cdot \Sigma O_{2w}$ of the burnt PM quantity has reached a target value or not. As this target value there is used, for example, the PM deposition quantity α (see step S3) at the beginning of forced regeneration which is calculated on the basis of a differential pressure between inlet and outlet pressures in the filter B.

As is seen also from the condition for determining the start of forced regeneration (e.g., the PM deposition quantity should be not smaller than a predetermined value, or the inlet-outlet differential pressure in the filter 8 should be not smaller than a predetermined value), the PM deposition quantity at the beginning of forced regeneration assumes an almost constant value, so that the PM deposition quantity at the beginning of forced regeneration may be obtained beforehand by experiment or test and the value thereof (fixed value) may be used as a target value.

If the PM combustion quantity has not reached the target value in step S11, the flow returns and the processing from step S1 to step S11 are repeated. If the PM combustion quantity reached the target value, the flow advances from step S11 to step S12, in which Forced Regeneration Flag F is set to 0 to terminate the forced regeneration.

In step S10 there may be calculated only the integrated value $\Sigma O_{2w}$, of an oxygen mass flow rate. In this case, in step S11, a value (α/C) obtained by dividing the PM deposition quantity a by a predetermined value C is set as a target value and it is determined whether the integrated value $\Sigma O_{2w}$ of an oxygen mass flow rate has reached the said target value or not.

Figure 5:
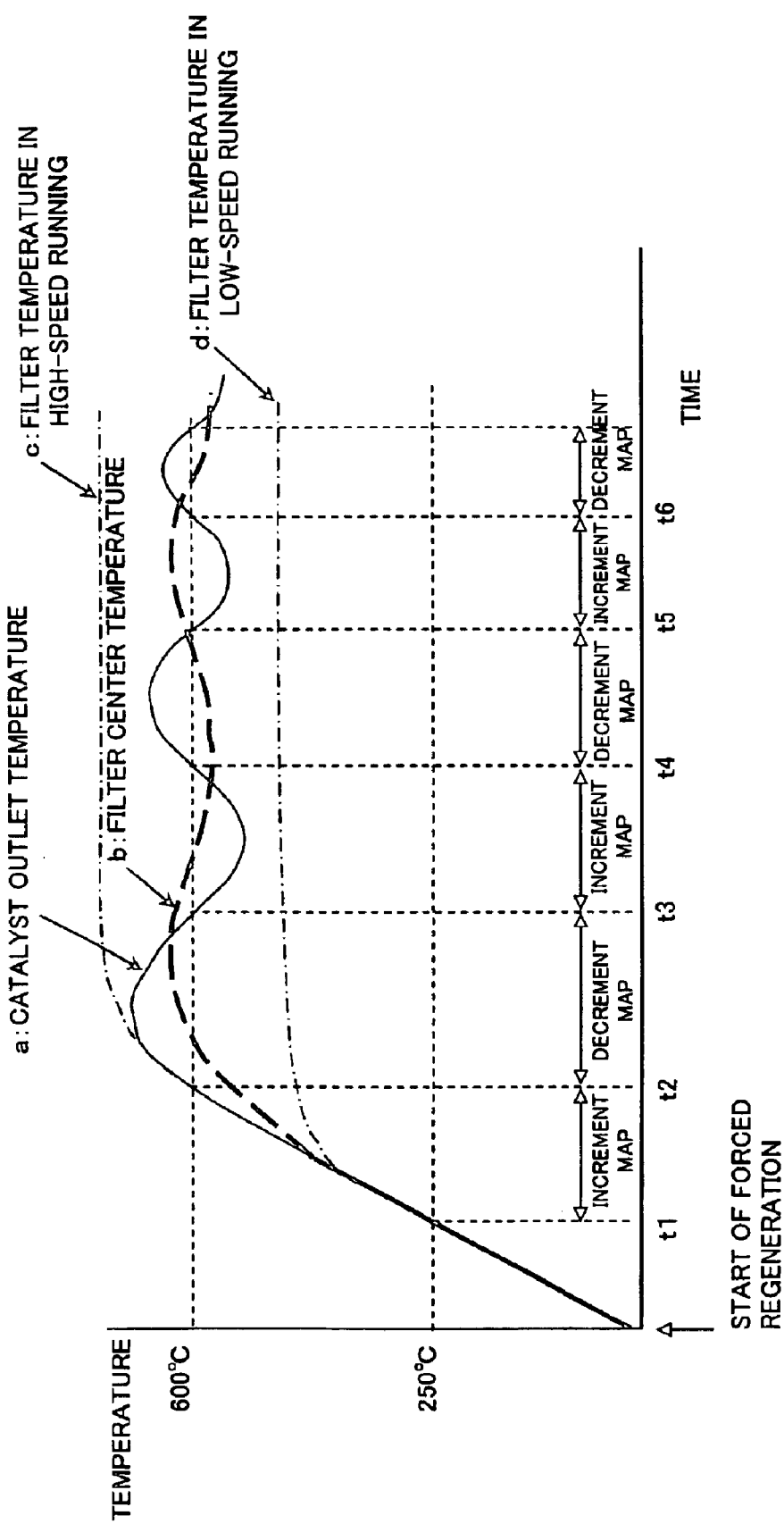
FIG. 5 illustrates the operation of the exhaust gas purifying system, in which the characteristics of the catalyst outlet temperature and the filter temperature are shown.

The function and effect of the present invention will now be described with reference to FIG. 5. Once the forced regeneration is started, the first additional fuel injection is performed to raise the temperature of the catalyst 6. When the outlet temperature of the catalyst 6 reaches a catalyst activating temperature (250° C.) (t1), the second additional fuel injection quantity is set in accordance with the increment map out of the two maps provided in the second additional fuel injection quantity setting means 30 until the filter temperature (here substituted by the catalyst outlet temperature) reaches a predetermined temperature (600° C.). When the catalyst outlet temperature exceeds the predetermined temperature, the second additional fuel injection quantity is set in accordance with the decrement map, whereby the catalyst outlet temperature drops as indicated with line a. Thereafter, when the catalyst outlet temperature becomes a temperature of not higher than the predetermined temperature ($t_3$), there is made switching again to the increment map and the second additional fuel injection quantity is set in accordance with the increment map. Thus, the catalyst outlet temperature varies in the vicinity of 600° C. and gradually converges to 600° C.

Since the center of the filter 8 is positioned upstream of the catalyst outlet, the center temperature of the filter 8, under the influence of heat capacity, can be held stably and highly accurately in the vicinity of the target temperature (600° C.), as indicated with line b, in comparison with the catalyst outlet temperature.

Both lines c and d represent filter temperature characteristics obtained when the second additional fuel injection quantity is set using a single map. Line c represents the filter temperature in high-speed vehicular running, while line d represents the filter temperature in low-speed vehicular running. As indicated by these lines c and d, in the case where the second additional fuel injection quantity is set using a single map, a certain vehicular running condition may result in that the filter temperature largely exceeds an allowable filter temperature, causing overcombustion of PM and consequent fusion of the filter 8, or may result in that the temperature of the filer 8 does not rise and PM is not. burnt efficiently.

In contrast therewith, according to the present invention, by executing a simple feedback control based on the catalyst outlet temperature there accrues an advantage that the temperature of the filter 8 (especially the center temperature of the filter) can be maintained near 600° C. which corresponds to the most efficient combustion of PM, regardless of a vehicular running condition (operating condition of the engine 2). Moreover, when the catalyst outlet temperature is for example lower than 600° C., the fuel injection quantity is increased and therefore the temperature of the filter 8 can be raised promptly to the target temperature even at a low catalyst temperature as is the case with the beginning of forced regeneration. This is also an advantage.

When the PM combustion quantity estimated by the PM combustion quantity estimating means 36 or the oxygen mass flow rate calculated by the oxygen mass flow rate calculating means 34 reaches a target value (PM deposition quantity estimated at the beginning of forced regeneration or an oxygen mass flow rate necessary for the combustion of PM), it is determined that the forced regeneration of the filter 8 is over. Thus, the regeneration end of the filter 8 can be determined with a high accuracy.

Further, since the second additional fuel injection quantity is changed by switching from one to another map among plural maps, the control logic is very simple and it is possible to enhance the reliability in control.

The present invention is not limited to the above embodiment, but various modifications may be made within the scope not departing from the gist of the invention. For example, although in the above embodiment the oxygen mass flow rate $O^{2w}$ is calculated in accordance with the equation (4), there may be adopted such a construction as shown in FIG. 6, wherein an $O_2$ sensor 50 for detecting the concentration of oxygen and a sensor 52 for detecting the flow rate L of fluid entering the filter 8 are disposed between the catalyst 6 and the filter 8, and the oxygen mass flow rate $O^{2w}$ is determined on the basis of detection results provided from both sensors.

Figure 6:
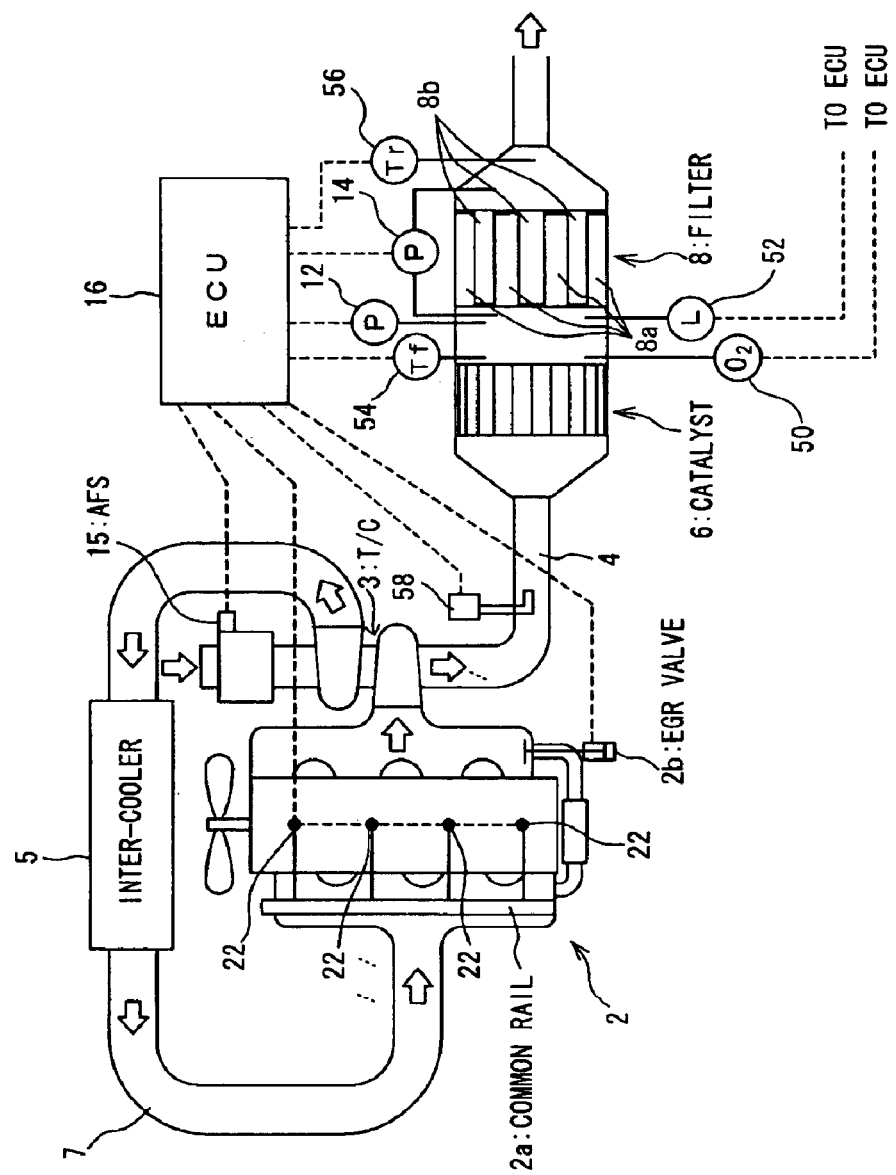
FIG. 6 is a schematic diagram illustrating a modification of the exhaust gas purifying system according to the present invention.

Although in the foregoing embodiment the catalyst outlet temperature is used as the filter temperature, there may be adopted such a construction as shown in FIG. 6, wherein temperature sensors 54 and 56 for detecting an inlet temperature Tf and an outlet temperature Tr, respectively, of the filter 8 are disposed upstream and downstream of the filter 8, and the temperature of the filter 8 is determined from the inlet and outlet temperatures Tf, Tr detected by the sensors 54 and 56 and in accordance with the following equation, in which a stands for a value for weighting the inlet and outlet temperatures Tf, Tr, satisfying the relation of $0 \leq a \leq 1$:

Filter temperature $T_{fil} = Tf \cdot a + Tr (1-a)$

Although in the foregoing embodiment a description has been given of the case where the present invention is applied to the system wherein the supply of fuel (HC) to the filter 8 is effected by performing the second additional fuel injection into the cylinder after the first additional fuel injection, the present invention is also applicable to other systems, for example the system (fuel addition system) illustrated in FIG. 6 which is constructed such that an injector (second injector) 58 for the supply of HC to the filter 8 is disposed in an exhaust passage such as an exhaust port or an exhaust pipe in an engine, and in a forced regeneration, fuel (HC) is added to the exhaust passage directly from the second injector 58 instead of the second additional fuel injection.

Also in this case the system may be constructed such that a fuel addition quantity is set in accordance with information such as the engine speed Ne detected by the engine speed sensor (engine speed detecting means) and the load information, q main, detected by the load detecting means and the fuel addition quantity is changed in accordance with the catalyst outlet temperature detected by the temperature sensor 10 (temperature detecting means). More specifically, an increment map (first fuel addition quantity map) in which the fuel addition quantity is set relatively large and a decrement map (second fuel addition quantity map) in which the fuel addition quantity is set smaller than in the first fuel addition quantity map, are provided and if the catalyst outlet temperature is lower than a target temperature (here 600° C.), the fuel addition quantity is set in accordance with the increment map, while if the catalyst outlet temperature is not lower than the predetermined target temperature, the decrement map is selected and the fuel addition quantity is set in accordance with the decrement map.

Such a fuel addition type system is of the same construction as that foregoing embodiment except that the injector 58 for the addition of fuel is added on hardware. Also as to the contents of control (software), it is substantially the same as that in the foregoing embodiment, with the only difference residing in that the second additional fuel injection in the foregoing embodiment is replaced by fuel addition. In this case, FIGS. 2 to 5 are also applicable by only replacing the second additional fuel injection by fuel addition.

What is claimed is:

1. An exhaust gas purifying system comprising:
   an oxidation catalyst disposed in an exhaust passage of an engine;
   a filter disposed in said exhaust passage at a position downstream of said oxidation catalyst to collect a particulate matter contained in exhaust gas;
   a first additional fuel control means which injects a first additional fuel into a cylinder during a forced regeneration of said filter and after a main fuel injection in said engine;
   a second additional fuel control means which supplies a second additional fuel to said oxidation catalyst after a rise in temperature of said oxidation catalyst up to an activation temperature of the catalyst and after the injection of said first additional fuel;
   a temperature detecting means for detecting an outlet temperature of said oxidation catalyst;
   an engine speed detecting means for detecting an engine speed of said engine;
   a load detecting means for detecting a load of said engine; and
   a second additional fuel supply quantity setting means which sets a supply quantity of said second additional fuel in accordance with information provided from said revolution detecting means and said load detecting means and which changes the second additional fuel supply quantity in accordance with information provided from said temperature detecting means,
   wherein said second additional fuel supply quantity setting means provides first and second additional fuel quantity setting values, the second additional fuel quantity setting value being smaller than the first additional fuel quantity setting value, and
   wherein the second additional fuel supply quantity setting means applies the first additional fuel quantity setting value when the oxidation catalyst outlet temperature is lower than a predetermined value, and applies the second additional fuel quantity setting value when the oxidation catalyst outlet temperature is at or greater than the predetermined value.

2. An exhaust gas purifying system according to claim 1, wherein said second additional fuel supply quantity setting means comprises:
   a basic map in which a basic additional fuel supply quantity value is stored; and
   a correction means which, in accordance with the oxidation catalyst outlet temperature, corrects the fuel supply quantity obtained from said basic map and wherein the fuel supply quantity corrected by said correction means is set as the second additional fuel supply quantity.

3. An exhaust gas purifying system according to claim 1, further comprising a forced regeneration start determining means which determines whether a forced regeneration of said filter is to be started or not.

4. An exhaust gas purifying system according to claim 3, wherein:
   said forced regeneration start determining means has a deposition quantity estimating means for estimating or calculating a deposition quantity of a particular matter deposited on said filter, and
   when the deposition quantity estimated or calculated by said deposition quantity estimating means reaches a value of not smaller than a predetermined value, the start of a forced regeneration of said filter is determined by said forced regeneration start determining means.

5. An exhaust gas purifying system according to claim 1, further comprising a regeneration end determining means for determining a regeneration end of said filter upon lapse of a predetermined time from the start of said forced regeneration.

6. An exhaust gas purifying system according to claim 1, wherein said engine is a diesel engine.

7. An exhaust gas purifying system comprising:
   an oxidation catalyst disposed in an exhaust passage of an engine;
   a filter disposed in said exhaust passage at a position downstream of said oxidation catalyst to collect a particulate matter contained in exhaust gas;
   a first additional fuel control means which injects a first additional fuel into a cylinder during a forced regeneration of said filter and after a main fuel injection in said engine;
   a second additional fuel control means which supplies a second additional fuel to said oxidation catalyst after a rise in temperature of said oxidation catalyst up to an activation temperature of the catalyst and after the injection of said first additional fuel;
   a temperature detecting means for detecting an outlet temperature of said oxidation catalyst;
   an engine speed detecting means for detecting an engine speed of said engine;

a load detecting means for detecting a load of said engine; and a second additional fuel supply quantity setting means which sets a supply quantity of said second additional fuel in accordance with information provided from said revolution detecting means and said load detecting means and which changes the second additional fuel supply quantity in accordance with information provided from said temperature detecting means, wherein said second additional fuel supply quantity setting means comprises;

a first fuel injection quantity map in which a fuel supply quantity is set;

a second fuel injection quantity map in which a fuel supply quantity is set smaller than in said first fuel injection quantity map; and a switching means which, when said oxidation catalyst outlet temperature has become lower than a predetermined value, sets said first fuel injection quantity map as a map for setting said second additional fuel supply quantity, and which, when said oxidation catalyst outlet temperature has become a value of not smaller than the predetermined value, switches from said first fuel injection quantity map to said second fuel injection quantity map.

8. An exhaust gas purifying system according to claim 7, wherein said first fuel injection quantity map is an increment map in which the fuel supply quantity of said second additional fuel to be injected into said cylinder is set relatively large, and said second fuel injection quantity map is a decrement map in which the second additional fuel supply quantity is set relatively small.

9. An exhaust gas purifying system according to claim 8, wherein said second additional fuel control means injects fuel into said cylinder to supply said oxidation catalyst with the fuel.

10. An exhaust gas purifying system according to claim 8, wherein said second additional fuel control means injects fuel onto said exhaust passage to add the fuel to said oxidation catalyst.

11. An exhaust gas purifying system comprising:

an oxidation catalyst disposed in an exhaust passage of an engine;

a filter disposed in said exhaust passage at a position downstream of said oxidation catalyst to collect a particulate matter contained in exhaust gas;

a first additional fuel control means which injects a first additional fuel into a cylinder during a forced regeneration of said filter and after a main fuel injection in said engine;

a second additional fuel control means which supplies a second additional fuel to said oxidation catalyst after a rise in temperature of said oxidation catalyst up to an activation temperature of the catalyst and after the injection of said first additional fuel;

a temperature detecting means for detecting an outlet temperature of said oxidation catalyst;

an engine speed detecting means for detecting an engine speed of said engine;

a load detecting means for detecting a load of said engine; and a second additional fuel supply quantity setting means which sets a supply quantity of said second additional fuel in accordance with information provided from said revolution detecting means and said load detecting means and which changes the second additional fuel supply quantity in accordance with information provided from said temperature detecting means.

wherein said second additional fuel supply quantity setting means comprises;

a first fuel injection quantity map in which the fuel supply quantity is set rather large;

a second fuel injection quantity map in which the fuel supply quantity is set smaller than in said first fuel injection quantity map;

a third fuel injection quantity map in which the fuel injection quantity is set still larger than in said first fuel injection quantity map; and a switching means which selects said third fuel injection quantity map when the oxidation catalyst outlet temperature is lower than a first predetermined value, selects said first fuel injection quantity map when the oxidation catalyst outlet temperature is not lower than the first predetermined value and lower than a second predetermined value, and selects said second fuel injection quantity map when the oxidation catalyst outlet temperature is not lower than the second predetermined value.

12. An exhaust gas purifying system comprising:

an oxidation catalyst disposed in an exhaust passage of an engine;

a filter disposed in said exhaust passage at a position downstream of said oxidation catalyst to collect a particulate matter contained in exhaust gas;

a first additional fuel control means which injects a first additional fuel into a cylinder during a forced regeneration of said filter and after a main fuel injection in said engine;

a second additional fuel control means which supplies a second additional fuel to said oxidation catalyst after a rise in temperature of said oxidation catalyst up to an activation temperature of the catalyst and after the injection of said first additional fuel;

a temperature detecting means for detecting an outlet temperature of said oxidation catalyst;

an engine speed detecting means for detecting an engine speed of said engine;

a load detecting means for detecting a load of said engine;

a second additional fuel supply quantity setting means which sets a supply quantity of said second additional fuel in accordance with information provided from said revolution detecting means and said load detecting means and which changes the second additional fuel supply quantity in accordance with information provided from said temperature detecting means;

a forced regeneration start determining means which determines whether a forced regeneration of said filter is to be started or not; and an absolute pressure detecting means for detecting an absolute pressure on an inlet side of said filter and a differential pressure detecting means for detecting a differential pressure between an inlet-side pressure and an outlet-side pressure of said filter, wherein said forced regeneration start determining means has a deposition quantity estimating means for estimating or calculating a deposition quantity of a particular matter deposited on said filter, and wherein said deposition quantity eslimating means estimates or calculates the deposition quantity of the particulate matter on the basis of information provided from both said absolute pressure detecting means and said differential pressure detecting means.

13. An exhaust gas purifying system comprising:

an oxidation catalyst disposed in an exhaust passage of an engine;

a filter disposed in said exhaust passage at a position downstream of said oxidation catalyst to collect a particulate matter contained in exhaust gas;

a first additional fuel control means which injects a first additional fuel into a cylinder during a forced regeneration of said filter and after a main fuel injection in said engine;

a second additional fuel control means which supplies a second additional fuel to said oxidation catalyst after a rise in temperature of said oxidation catalyst up to an activation temperature of the catalyst and after the injection of said first additional fuel;

a temperature detecting means for detecting an outlet temperature of said oxidation catalyst;

an engine speed detecting means for detecting an engine speed of said engine;

a load detecting means for detecting a load of said engine;

a second additional fuel supply quantity setting means which sets a supply quantity of said second additional fuel in accordance with information provided from said revolution detecting means and said load detecting means and which changes the second additional fuel supply quanity in accordance with information provided from said temperature detecting means;

an oxygen mass flow rate detecting means for detecting or calculating a mass flow rate of oxygen led to said filter; and a regeneration end determining means for determining a regeneration end of said filter in accordance with information provided from said oxygen mass flow rate detecting means and upon arrival of an integrated value of said oxygen mass flow rate at a predetermined value during a forced regeneration of said filter.

14. An exhaust gas purifying method using an oxidation catalyst disposed in an exhaust passage of an engine and a filter disposed in said exhaust passage at a position downstream of said oxidation catalyst to collect a particulate matter contained in exhaust gas, and wherein a first additional fuel is injected into a cylinder during a forced regeneration of said filter and after a main fuel injection in said engine, and a second additional fuel is supplied to said oxidation catalyst after a rise in temperature of said oxidation catalyst up to an activation temperature of the catalyst and after the injection of said first additional fuel, said method comprising the steps of:

detecting an outlet temperature of said oxidation catalyst, an engine speed of said engine, and a load of said engine; and setting a supply quantity of said second additional fuel on the basis of said engine speed and said load and changing the second additional fuel supply quantity on the basis of said outlet temperature of the oxidation catalyst, wherein the setting step includes applying a first additional fuel quantity setting value when the oxidation catalyst outlet temperature is lower than a determined value, and applying a second additional fuel quantity setting value, which is lower than the first additional fuel quantity setting value, when the oxidation catalyst outlet temperature is at or greater than the predetermined value.

15. An exhaust gas purifying method according to claim 14, wherein said second additional fuel is injected into the cylinder of said engine.

16. An exhaust gas purifying method according to claim 14, wherein said second additional fuel is injected onto the exhaust passage of said engine.

17. An exhaust gas purifying method using an oxidation catalyst disposed in an exhaust passage of an engine and a filter disposed in said exhaust passage at a position downstream of said oxidation catalyst to collect a particulate matter contained in exhaust gas, and wherein a first additional fuel is injected into a cylinder during a forced regeneration of said filter and after a main fuel injection in said engine and a second additional fuel is supplied to said oxidation catalyst after a rise in temperature of said oxidation catalyst up to an activation temperature of the catalyst and after the injection of said first additional fuel, said method comprising the steps of:

detecting an outlet temperature of said oxidation catalyst, an engine speed of said engine and a load of said engine;

setting a supply quantity of said second additional fuel on the basis of said engine speed and said load and changing the second additional fuel supply quantity on the basis of said outlet temperature of the oxidation catalyst;

determining whether an integrated value of an oxygen mass flow rate from the time-point of arrival of the temperature of said filter at a predetermined temperature during execution of said forced regeneration has reached a predetermined value or not; and terminating said forced regeneration upon arrival of said integrated value of the oxygen mass flow rate at a predetermined value.

* * * * *